UNITED STATES PATENT OFFICE.

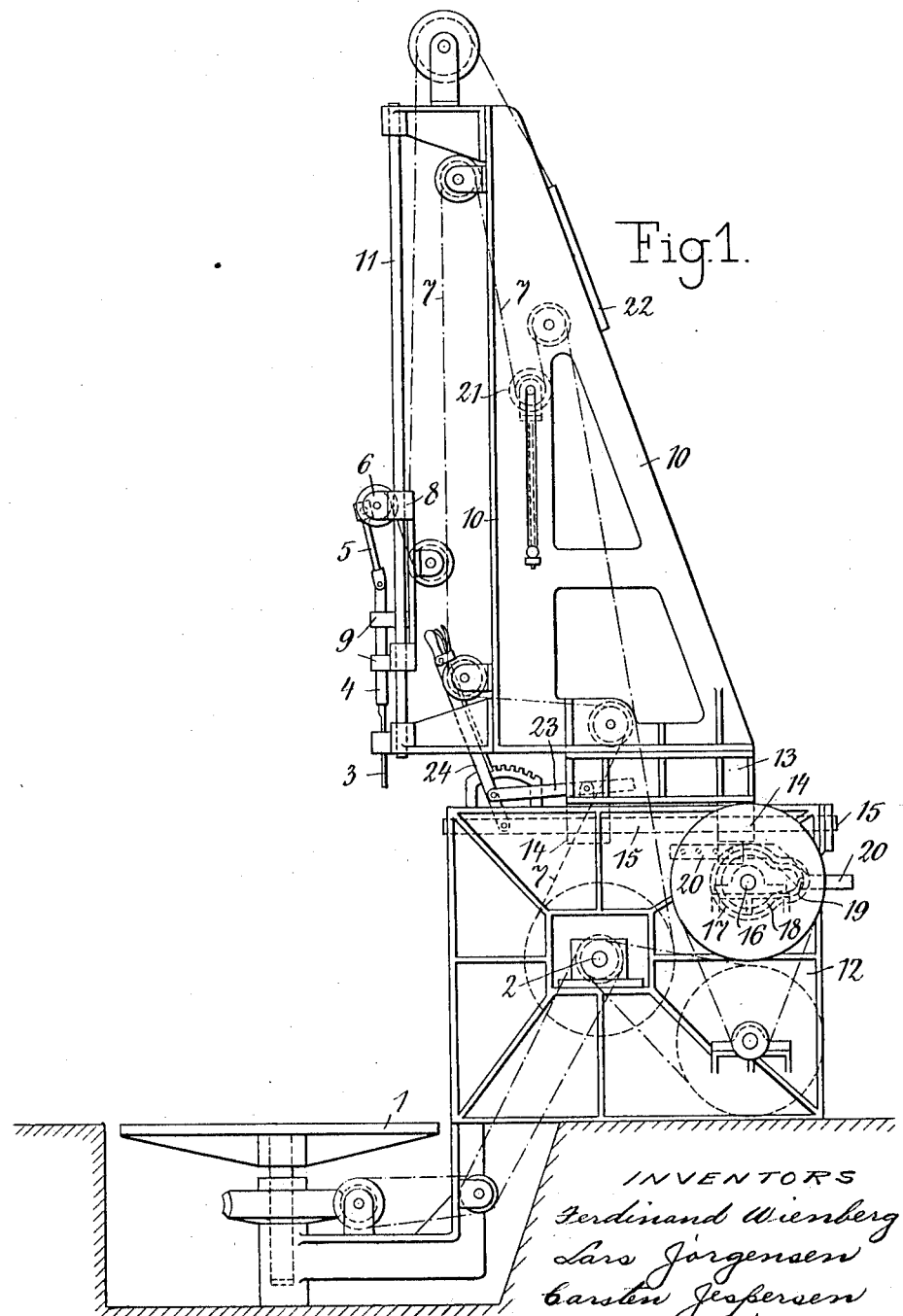

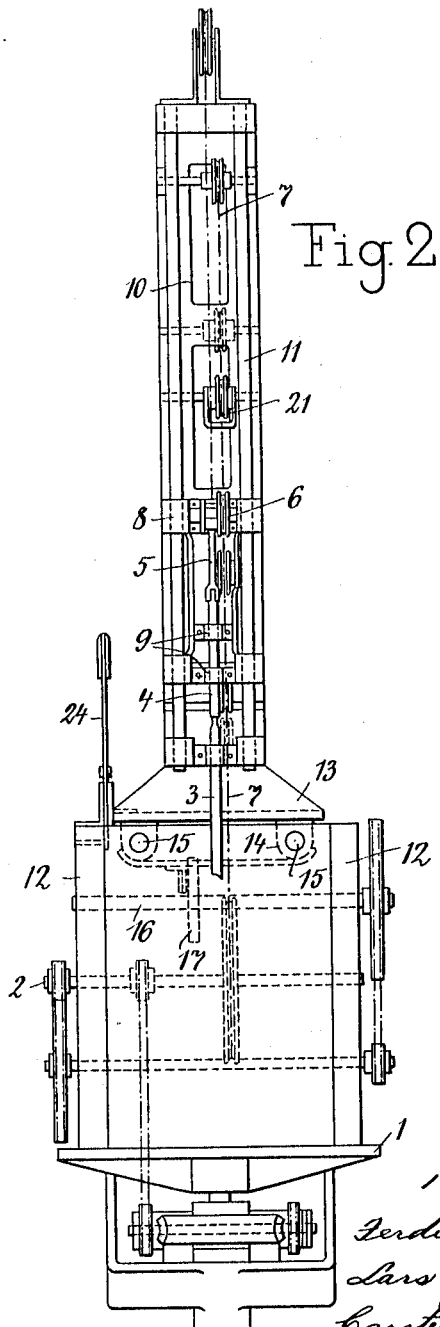

FERDINAND WIENBERG, OF COPENHAGEN, AND LARS JÖRGENSEN, CARSTEN JESPERSEN, AND JÖRGEN KRISTIAN JÖRGENSEN, OF ELSINORE, DENMARK.

MACHINE FOR MAKING CEMENT PIPES OF ANY SECTIONAL FORM.

1,022,285. Specification of Letters Patent. Patented Apr. 2, 1912.

Application filed October 20, 1910. Serial No. 588,136.

*To all whom it may concern:*

Be it known that we, FERDINAND WIENBERG, manufacturer, a subject of the King of Denmark, and residing at Copenhagen, in the Kingdom of Denmark, and LARS JÖRGENSEN, manufacturer, CARSTEN JESPERSEN, master carpenter, and JÖRGEN KRISTIAN JÖRGENSEN, master mason, all subjects of the King of Denmark, residing at Elsinore, in the Kingdom of Denmark, have invented new and useful Improvements in Machines for Making Cement Pipes of any Sectional Form, of which the following is a specification.
The present invention relates to machines for making cement pipes, especially to such machines having the space above the rotating mold quite free, particularly not encumbered with any guiding arrangements as pattern plate or the like. Such machines have proved to be the most practical for manufacturing smaller pipes, as the machinery can be very simple and the removal of the filled mold and the placing of a new empty mold can take place in the most convenient manner. The machines of this kind hitherto known, however, have been used only to make circular pipes, or have been somewhat cumbersome.
The object of this invention is to perfect such machines, so as to make them adaptable for making non-circular pipes as well as for making circular pipes.

The invention is illustrated in the accompanying drawing.

Figure 1 shows a side view and Fig. 2 shows a front view of the machine.

The mold, not shown in the drawing, is placed on the plate 1, which by aid of worm-wheel and chain-drive or other proper clutch is slowly turned by the main shaft 2 of the machine, which is connected to the driving shaft of the motor by a proper transmission arrangement. From the main shaft 2, the stamper 3 is also operated and which, during the working of the machine, makes short up and down movements thus stamping the cement which is fed in the slowly rotating mold, in layers of small thickness. The head of the stamper 4 is connected with a crank 6 in any well known manner, as by means of a connecting rod 5. The shaft of the crank 6 is rotated quickly by a cord-drive 7 from the main shaft, just as the pillow block 8 for the said crank-shaft and the guides 9 for the head of the stamper, being closely connected with this pillow block, are automatically lifted up by means of a counter weight 22, as the quantity of cement in the mold is gradually increased. If the stamper was working the whole time vertically above one and the same point, the mold would necessarily always be circular; should, however, the section of the pipe, and consequently the mold too, be non-circular, the stamper should be able preferably automatically, to approach and withdraw from the axis of revolution of the plate. By the present machine this is accomplished in the following way: The frame 10, carrying the guide-rods 11 for the above mentioned parts 8 and 9, is movably fixed to the lower stationary part of the machine 12. It can advantageously be fixed to a sledge 13, which is supplied with guide-nuts 14 engaging horizontal steering or slide rods 15 fastened to the frame 12. In this frame a shaft 16 is situated, which is parallel with the main shaft. This shaft 16 is operated from the main shaft by a proper clutch, so that it rotates with exactly the same speed as the plate 1. On the shaft 16 there is fixed a guide-disk 17 with groove 18, that exactly corresponds to the non-circular form, which the pipe is to have, and into which a guide pivot 19 on a driving-rod 20 engages, which driving-rod has a series of holes 25 and is connected with the sledge 13 by means of a pin through a lug on the slide and through one or the other of these holes, so that the machine can be adjusted to different pipe sizes. The guide-disk 17, which causes the sledge 13 to follow the non-circular form is fixed to the shaft 16 and can easily be taken off and replaced with a different one, so that the guide disk, by choice of several types and numbers, can be proportioned according to the pipe that is to be made.

The machine can also be used for making circular cement pipes. If such a pipe is to be made, it is only necessary to disconnect the above described pushing device and to use the lever 24, which is connected with the sledge 13 by means of a draw rod 23. The draw rod 23 is pivotally connected with the slide 13 as well as with the lever 24, which itself is pivotally affixed to the under-frame 12. When not in use, the rod 23 is uncoupled from the slide 13 or from the lever 24. The face of the segment is furnished with notches in order to keep the slides 13 in the position, which corresponds to the particular size of circular pipe.

In order to always keep the driving-cord 7 for the stamper at a constant tension in spite of the pushing of the frame 10 on the stationary frame 12, the said cord is drawn under a loose pulley 21 in the jaw of which a plummet of suitable weight is suspended.

We claim:

In a machine for making cement pipes of any sectional form, the combination with a rotatable mold plate, adapted to carry the mold, the space above said plate being free, means for rotating this plate, a stationary frame, an upper frame slidingly mounted thereon, a stamper mounted on said upper frame, means for moving the stamper in vertical directions to stamp the cement within the mold, an interchangeable grooved guide disk, a guide pivot engaging therewith, to which said guide pivot is fixed a driving rod, secured on the upper frame, and means for rotating the guide disk to cause the frame and the stamper mounted thereon to move to and from the axis of the mold plate according to the form of the mold, of means for securing the driving rod in different positions on the upper frame so as to make the machine adjustable to different sizes of pipes, substantially as described.

In testimony whereof we have signed our names to this specification in the presence of two subscribing witnesses.

FERDINAND WIENBERG.
LARS JÖRGENSEN.
CARSTEN JESPERSEN.
JÖRGEN KRISTIAN JÖRGENSEN.

Witnesses:
AXEL PERMIN,
VALDEMAR CHRISTENSEN.

---

Copies of this patent may be obtained for five cents each, by addressing the "Commissioner of Patents, Washington, D. C."